United States Patent
Baker et al.

[11] 3,892,494
[45] July 1, 1975

[54] DETECTION OF OPTICAL MICRO-DEFECTS WITH FOCUSED RETROREFLECTED SCANNING BEAM

[75] Inventors: Lionel R. Baker, Orpington; Anthony J. Kirkham, Bromley; Stanley Martin, Catford; Daniel R. Lobb, Farnborough; Christopher P. Rourke, Petts Wood, all of England

[73] Assignee: Sira Institute, Chislehurst, Great Britain

[22] Filed: July 23, 1973

[21] Appl. No.: 381,457

[30] Foreign Application Priority Data
July 26, 1972 United Kingdom............ 34851/72
Dec. 16, 1972 United Kingdom............ 58217/72
Mar. 8, 1973 United Kingdom............ 11386/73

[52] U.S. Cl. ............ 356/239; 250/572; 356/120; 356/124; 356/237
[51] Int. Cl. ... G01n 21/16; G01n 21/32; G01j 1/00
[58] Field of Search ........... 356/124, 237, 239, 120; 250/563, 572

[56] References Cited
UNITED STATES PATENTS
| | | | |
|---|---|---|---|
| 3,338,130 | 8/1967 | Gaffard............................. | 250/572 |
| 3,734,626 | 5/1973 | Roberts et al. ................... | 356/124 |
| 3,790,287 | 2/1974 | Cuthbert et al................... | 356/237 |

*Primary Examiner*—Vincent P. McGraw
*Attorney, Agent, or Firm*—Sughrue, Rothwell, Mion, Zinn & Macpeak

[57] ABSTRACT

A method and apparatus for testing the surfaces of optical components for scratches by scanning a focussed beam of light across the surface, retroreflecting the light beam and separating the reflected light. The apparatus is adapted for automatic control and can be used to automatically accept or reject optical components.

29 Claims, 4 Drawing Figures

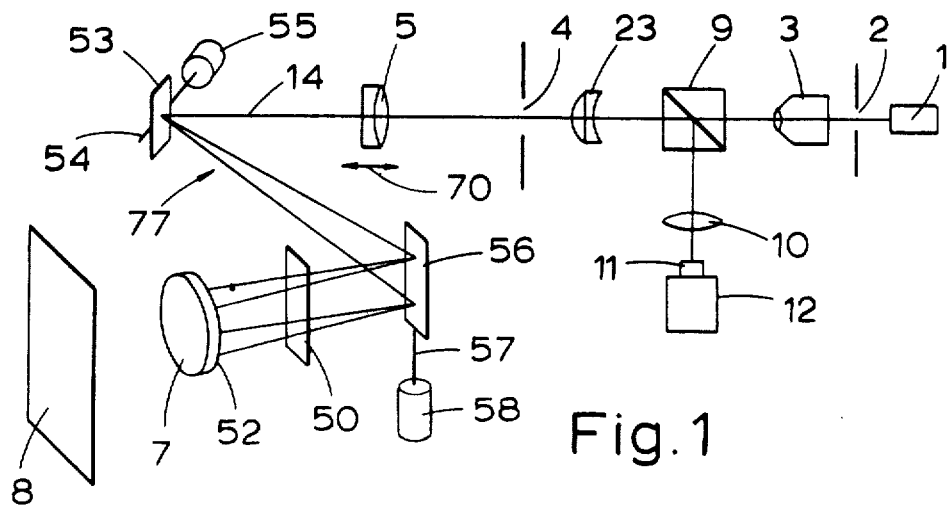
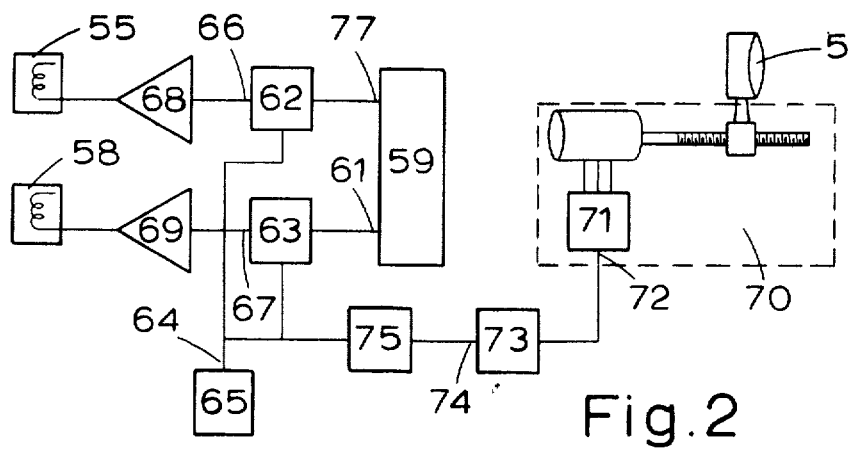
Fig. 1
Fig. 2
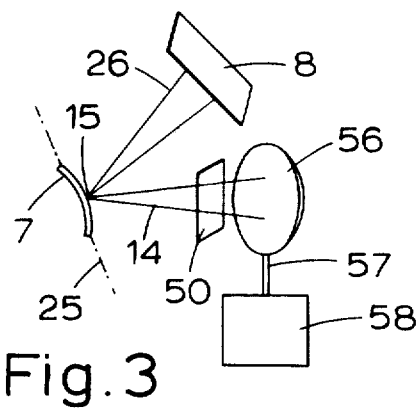
Fig. 3
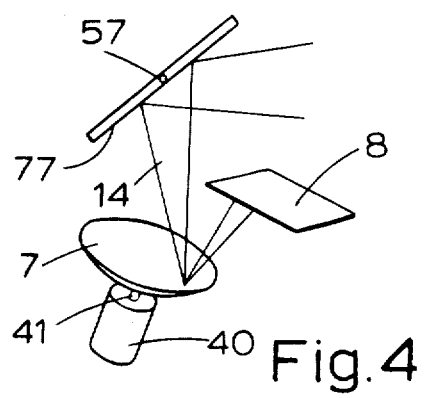
Fig. 4

DETECTION OF OPTICAL MICRO-DEFECTS WITH FOCUSED RETROREFLECTED SCANNING BEAM

BACKGROUND OF THE INVENTION

The invention relates to methods and apparatus for testing optical components to detect defects therein. It is known to inspect objects and materials for defects by causing an object or material to be scanned by a beam of light and detecting light passed by faults in the object or material by the use of photoelectric means.

In the application of such techniques to the inspection of optical components such as lenses, shaped mirrors and prisms, considerable difficulties are experienced in detecting defects whose influence on the incident light is small. Although, in theory, it is possible to discriminate between light which follows the path which it would follow under the influence of a perfect inspected optical component from light which is slightly deviated by means including further optical devices which collect light at a point, in practice this is nearly impossible. Firstly, small scratches and sleeks in optical lenses may produce only a slight scattering or deviation of the incident light from the path which the light would follow if the inspected component were perfect. Secondly, the further optical device require critical adjustment in relation to each different component under test, and in many cases, such as curved lenses or mirrors, the further optical devices would require to be individually adjusted constantly in several directions as the light beam scans across the component under test. Such adjustment is inconvenient and makes demands on the skill and patience of an operator which it is desirable to avoid.

The problem becomes more and more acute as the width of the beam of light and its depth of focus is reduced to allow the detection of finer faults.

SUMMARY OF THE INVENTION

According to one aspect of the invention a method of testing an optical component to determine the presence of defects therein comprises the steps of illuminating the component with an incident beam of light focused on part of the component, relatively moving the beam of light and the component to scan successive parts of the component, reflecting retroreflectively light from the beam after it has been influenced by the component so that the retroreflected light passes back and is again influenced by the optical component, separating the retroreflected light which has been influenced by an acceptable part of the component from the incident light beam and detecting the separated retroreflected light by photoelectric means to produce a signal indicative of defects in the component.

According to a second aspect of the invention an apparatus for inspecting an optical component to detect defects therein comprises means for supporting the optical component, a light source, means for producing an incident beam of light focused on part of the component when so mounted, means for relatively moving the beam and the component to scan successive parts of the component, retroreflective means for retroreflecting light derived from the beam which has been influenced by the component so that the retroreflected light is passed back and is again influenced by the optical component, means for separating the retroreflected light which has been influenced by an acceptable part of the optical component from the incident light beam, and photoelectric means to derive an electric signal in dependence on the separated retroreflected light.

In this specification the word "light" is intended to include not only visible light but also ultraviolet and infrared radiation.

In this specification the words "retroreflective means" signifies means having the property that any incident ray of light is reflected back substantially along the path by which it was incident on the retroreflective means with in general a small amount of diffusion. Such retroreflective means is widely used in, for example, road signs and vehicle licence plates and an example of such material is sold under the trademark "Scotchlite."

A significant advantage of the invention is that by virtue of the use of retroreflective means the light which has been influenced by the optical component is reflected back along generally the same path to the optical component. Thus, the light is acted upon by the optical component twice, but in opposite directions so that the light which has been retroreflected and influenced for a second time by the optical component will form a light beam generally coaxial with the original light beam but passing in the opposite direction.

If, however, a fault is present the incident beam of light will be deflected in a different direction either away from the retroreflector, in which case no signal is produced by the photocell or, if it strikes the retroreflector a small cone of light will be retroreflected back to the optical component, the cone being generally centred on the fault. However, most of the cone will not strike the fault and will be acted upon by the optical component to produce a beam which does not return along the path of the incident light beam. Only the very centre portion of the cone of retroreflected light will pass back through the fault and be acted upon by the fault to be passed back along the path of the incident light beam. Thus only a small proportion of the light which is incident on the fault will be detected.

This will be true of all the normal optical component such as lenses or mirrors and will not greatly depend on their individual characteristics such as focal length or radius of curvature nor on their alignment with the apparatus. Thus no critical adjustment is necessary even if, for example, different types of lenses are successively to be tested. and the system can generally be described as being self compensating for different optical components.

A further advantage of one embodiment of the apparatus and method is that it can be used to examine lenses and other components only finished on one side since the light when it passes through the other, unfinished side is out of focus.

The means for producing the beam of light may include one or more stops and collimating and focusing devices. A stop included in the beam producing means may also serve to limit the angle over which retroreflected light may leave the object under test and reach the photoelectric means. The retroreflected light separating means may be included in the beam producing means.

The source of light from which the beam is formed may conveniently be a laser, which provides a convenient way of forming a beam which converges to a very small and intense spot of light on the component under test. The coherence of the light from the laser has not been found to be important, although it is possible that in some forms of apparatus according to the invention the coherence may be a disadvantage. In principle an incoherent source would be preferred, but it is found in practice that the efficiency with which light can be concentrated from such a source is so low that a laser is more practical as a source of light.

It has been found in the use of the invention for testing or inspecting optical components having deeply curved surfaces that it may be advantageous to provide means for moving the focal point so that it may be varied during the course of the scanning process in order to prevent the focal point from leaving the surface because of the curvature of the component.

Preferably the light beam is automatically focused onto the surface of the optical component during scanning and therefore the apparatus of the invention may include focusing means adapted, in use, automatically to retain the focal point of the beam of light on a surface of the optical component during the scanning operation.

The automatic adjustment to maintain the focus of the beam during the scan is preferably synchronised with the scanning operation. Such synchronisation may be achieved by providing and using adjusting means responsive to the position of the scanning means or some function thereof, or to a timing or controlling means to which the scanning means is also responsive; or a cam mechanism which may comprise the surface of the component whereon the focus of the beam is to be maintained. The adjusting means may incorporate controls which may be set manually or otherwise to cause the adjusting means to maintain the focus as desired. The component itself may operate a mechanism for operating or controlling the adjusting means. In this latter case it is desirable to avoid contact between the mechanism and the component, in order to avoid scratching the component, and a non-contacting servomechanical follower may be used such as a follower actuated by an air probe similar to such probes as are known and used in air gauging or alternatively a follower having means for optically sensing part of the surface of the component.

When the adjusting means is synchronised with the scanning means the speed with which the adjusting means is required to operate is related to the speed and form of the scanning process. The speed of scanning is desirably made as high as practicable, in order to minimise the time required for completion of a test or inspection. It will be apparent that if a rectilinear scan is performed across a curved surface it will generally be necessary to make the adjusting means alter the focusing means at least twice per scan. For instance, if the scanning means lies on the axis of a deeply curved convex lens then during a single scan between the ends of a diameter of the lens the distance between the scanning means and the focal point will be required to be a certain value at the start of the scan, to be reduced at the centre of the scan, and to return to the said certain value at the end of the scan. The need for high speed operation of the adjusting means may be reduced by using alternative forms of scanning; in this way the adjusting means can be made simpler, and a limitation of the scanning speed or frequency which might be imposed by limited speed of action of the adjusting means can be reduced or avoided.

When the present invention is to be used for examining a surface of revolution, such for example as a generally spherical surface of a lens or the like, the scanning process is preferably generally spiral. That is to say the focus of the beam of light follows a path on the surface bening examined, the path being such in relation to the surface as would be generated by rotating the surface about its axis and causing the focus to move across the surface of the component. The spiral scanning path may be achieved by rotating the component being inspected and moving the beam so that its focus moves across the component but if the scanning is to be perfomred rapidly there may be problems in sufficiently accurately rotating the component, or in sufficiently accurately or securely mounting it for rotation. In some instances, therefore, it is preferred to hold the component so that it does not rotate and to generate the spiral path by the use of the scanning means only. The spiral is preferably an equidistant spiral, i.e. with a substantially constant distance between successive turns thereof, this distance being determined by the size of the focal spot of the beam. Thus a single spiral scan can cause the focus of the beam to traverse the whole of the surface of the component being inspected to enable defects in any part thereof to be detected if required. When such a spiral scanning path is used the focus adjusting means need only operate slowly compared with the requirement for a rectilinear scan, since the whole range of focus adjustment need only be traversed once during the time of scanning the whole surface, whereas in a linear raster type scan the majority of the range of adjustment would be required to be traversed many times during the scanning of only part of the surface.

There is a variety of known mechanisms which could be used for generating a spiral scan, in the application of which to this invention a prime consideration would be the achievement and maintenance of the requisite accuracy of scanning. Purely electronic means, which may include a cathode ray tube, could be used, wherein a prime consideration might be the achievement of sufficient brightness. In a preferred arrangement a simple mechanism electrically actuated under electronic control is used.

In a preferred method the light is passed in one direction through a phase plate (as hereinafter defined) before it is retroreflected and in the opposite direction after it is retroreflected. The apparatus of the invention therefore preferably includes a phase plate positioned in the light path between the separating means and the retroreflective means.

By a phase plate is meant an optical device having the property that the difference of phase between incident and emergent light in one polarisation plane differs from the difference of phase between incident and emergent light in the orthogonal polarisation plane. Phase plates are well known and rely on materials which have different refractive indices for light polarised in two mutually orthogonal planes. A phase plate is characterised, for any given wavelength of light, by the difference between the phase differences aforesaid, and by a pair of axes representing the intersection of the plane of the plate with the said planes. Preferably in this invention that difference is a quarter-wavelength of the light which is to be used, i.e. the plate is what is commonly called a λ/4 plate ( a quarter wave plate).

The separating means is preferably a beam-splitting cube, and special advantages may be obtained when the cube is of the kind known as a polarising beam-splitting cube.

BRIEF DESCRIPTION OF THE DRAWINGS

FIG. 1 is a diagrammatic view of a first apparatus according to the invention,

FIG. 2 is a diagram of the electronic circuit and other parts for controlling the scanning and focusing, FIG. 3 is a diagram of an alternative arrangement of part of FIG. 1, and FIG. 4 is a diagram of yet a further alternative arrangement of the part shown in FIG. 3.

DESCRIPTION OF THE PREFERRED EMBODIMENTS

FIG. 1 shows a light source which may conveniently be a laser 1. Light from the laser 1 passes through a stop 2 whose function is to suppress light arising from unwanted modes in the laser 1. A microscope objective 3 reduces the size of the light beam which, after emerging from the objective 3 is partially transmitted through a polarising beam splitter 9, collimated by a collimating device 23, passed through an adjustable stop 4 and focussed by a focussing device 5 to form a beam of light 14 represented in the Figure by lines indicating various positions of the centre line thereof.

The polarising beam-splitting cube 9 transmits a high proportion of light incident thereon which is polarised in the plane of FIG. 1, and the laser 1 is accordingly arranged to provide light so polarised.

The focus of the beam is arranged as described in more detail hereinafter to be on a surface 52 of an optical component 7 to be inspected. For the purpose of this exemplary description the component 7 will be taken to be a lens of which the surface 52 to be examined is spherical and convex, although the apparatus is not restricted to use with this particular test component. The beam is directed towards a particular point on the surface 52 by a scanning arrangement 77 for producing a spiral scan. The scanning arrangement 77 comprises a mirror 53 rotatably mounted on an axis 54 and provided with a rotary drive means 55 for rotating it about the axis 54, and a further mirror 56 rotatably mounted on an axis 57 and provided with a rotary drive means 58 for rotating it about the axis 57.

The axis 54 lies in a common horizontal plane with the optical axis of the light source 1 and successive optical components 3, 23, 4 and 5 and is at an angle with that optical axis which may, for example be 20 degrees. The mirror 56 extends above and below the said common horizontal plane, so that both the surface of the mirror 56 and the axis 57 are vertical. A λ/4 (quarter wave) phase plate 50 is interposed between the mirror 56 and the component 7. The axis of the phase plate 50 are arranged at 45 degrees to the plane of FIG. 1 in consequence whereof the light is circularly polarised as the light passes through the plate.

A retroreflector 8 is positioned so as to receive light derived from the beam 14 and transmitted through the component 7. The retroreflector may be a sheet of "Scotchlite" (Trade Mark). Light incident on the retroreflector is returned in substantially the same direction as that from which it has come, with some slight diffusion to thereby form a cone. Light falling on the retroreflector is retroreflected and part at least thereof passes back through the component 7, and the phase plate 50 which changes the polarisation of the light from circular polarisation to plane polarisation in a plane perpendicular to the plane of FIG. 1, is reflected by the mirrors 56 and 54 and collimated by the focussing means 5, passes through the stop 4 and through the collimating device 23 which causes the light to converse as it enters the beam splitter 9. The light reaching the beam splitter 9, remains polarised perpendicular to the plane of FIG. 1. Light of this polarisation entering the beam-splitting cube 9 is mainly reflected at the internal interface thereof and is thereby directed towards a lens 10 and then into a silicon photovoltaic photocell 11 of bandwidth 500 kHz mounted in an amplifier assembly 12.

It will be obvious that the rotation of the plane of polarisation of the light beam by 90 degrees being appropriate to enhance the performance of the beam splitter 9, a considerable improvement in signal is obtained; it has been found that even beam splitting cubes not specifically designed as polarising ones do in fact depend on the polarisation of the light sufficiently to make the observed difference in signal with and without rotation of polarisation very considerable.

The amplifier assembly 12 may be connected to further devices not shown for producing a defect-indicative signal.

When the beam of light 14 is focussed on a part of the component 7 containing a scratch, sleek or other defect, some of the light in the beam is deflected from the path which it would have taken in the absence of such defect. As described earlier, light so deflected may not reach the retroreflector 8 but, if it does, then after retroreflection, because of the slight diffusion introduced by the retroreflector, the majority of the deflected and retroreflected light passes back through a part of the component 7 which does not have a precisely corresponding defect, and therefore continues in a direction other than that taken by light which has not been deflected by a defect. In consequence such light, or a portion thereof, will fail to pass through the stop 4, with the result that the amount of light entering the photocell 11 will be diminished. This diminution in the light entering the photocell 11 causes the photocell to generate a corresponding change of signal indicative of the defect.

The retroreflector 8 is preferably placed at a suitable distance from the component 7 such that light from the beam 14 is not sharply focussed on the retroreflector, so that as the beam is scanned the amount of light returned by the retroreflector is not appreciably dependent on variations in the retroreflective surface, such as those due to its granular nature, or to the presence of small pieces of dirt thereon. On the other hand excessive separation between the retroreflector 8 and the component 7 causes, as a result of the diffusion by the retroreflector, an excessive proportion of the returned light to fail to pass back through the stop 4, thus reducing the strength of the received signal. It has been found in practice that a reasonable compromise between these two requirements can be achieved without difficulty.

The size of the spot to which the beam of light is focussed cannot be reduced beyond a certain degree of smallness dependent on well known optical considerations. It has been found in practice however that with a spot size of 25 μm it is possible to detect the presence of fine scratches and similar defects having dimensions of the order of 2–15 μm. Larger defects may also be detected, but may not necessarily produce correspondingly increased signals; this is not necessarily disadvantageous however.

Although a conventional linear scan has been found to work quite satisfactorily it has been found that there are limitations in its application owing to the fact that the depth of focus of the spot 15 of light on the surface of the component 7 is small, usually about 1/2 mm or so. Thus as the spot is scanned across the component it often goes out of focus. The embodiment shown in FIG. 1 includes a means for automatically retaining the beam 14 in focus on the surface of the component 7 during scanning.

If it is intended to automatically change the focal point continuously so as to allow the beam always to be focused on the surface of the component, then it will be appreciated that if a linear scan is used then the focus of the device will have to be continuously changed as the beam of light is scanned across the component. However, if a spiral scan is utilised then it is only necessary to change the focus slowly as the scan moves outwardly across the component. The apparatus of FIG. 1 incorporates an automatic focussing system and a spiral scan arrangement.

For the production of the spiral scan the rotary drive means 55 and 58 are preferably electromagnetic torque motors which may have a range of rotation which is a part of a revolution in each case, and which may conveniently be of a known kind which produces an angular deflection approximately proportional to the strength of an electrical current passed between terminals thereof. The terminals of each motor are connected to be driven electrically by a current source as shown in FIG. 2. A two-phase oscillator 59 has outputs 60, 61 each of which produces a sinusoidal signal, the two signals being of the same frequency and mutually in quadrature. We may define the signal from output 60 to be a voltage $A = a \cos wt$ volts, where $a$ is a constant, $w$ is a pulsatance (i.e. $2\pi$ multiplied by the frequency of oscillation in Hertz) and $t$ is time in seconds; the signal from output 61 being likewise $B = b \sin wt$ volts. Output 60 carrying the signal A is connected to an input of a multiplier 62 and the output 61 carrying the signal B is connected to a like input of a further multiplier 63. Second inputs of each of multipliers 62 and 63 are connected together to receive a time-variant signal from an output 64 of a time-signal or ramp generator 65. The generator 65 may be of any suitable kind, such for instance as an operational amplifier having capacitive feedback and a resistive input connection from a constant voltage, as well known in the art of analogue computation. The generator 65 is provided with suitable control means, such as are known, to control the operation of the generator (such, for example, as its rate of integration) to cause it when required to produce at its output 64 a signal which varies linearly with time, the signal being conveniently zero at the start of an operation and increasing in proportion to time during the operation. The multiplier 62 is adapted to receive the signal A and the signal from the generator 65 and to provide at an output 66 of the multiplier a signal which may be an electrical voltage proportional to the product of the two received signals. If the signal from generator 65 is represented by a voltage $k't$ for instance, the output 66 will produce a signal $k'tA = ak't \cos wt$. Likewise an output 67 of the multiplier 63 provides a further signal $k'tB = bk't \sin wt$. The outputs 66 and 67 are connected respectively to inputs of power amplifiers 68 and 69, which in turn are connected to the terminals of the torque motors 55 and 56 aforesaid respectively. The signals from the outputs 66, 67 are amplified by the amplifiers 68, 69 respectively to produce currents in the motors substantially proportional thereto, and these currents cause the motors to execute substantially corresponding motions. The displacement of each motor may lag behind the driving current because of mechanical inertia or electromagnetic inductive effects, but, as will be readily appreciated by those skilled in the electromechanical art the form of the motion will be substantially preserved, although delayed. Furthermore, if the motors, the inertia of parts mechanically attached to them, and the amplifiers are respectively similar the amount of delay will be comparable in each case; if this is not so it may be desirable to insert into the signal paths or one of them a means for adjusting the phase of one or both signals, and to use this means to bring the motions of the motors exactly 90° out of phase.

As has been mentioned, the electronic arrangement shown in FIG. 2 causes the mirrors 53, 56 to carry out part rotary motions. If the two motions are exactly 90° out of phase and have constant amplitude then the mirrors will cause the beam 14 to execute a circular path around the axis of the optical component 7. However, if it is arranged that the amplitude is proportional to time as mentioned above, then the motion executed by the beam will be a spiral motion so that a spiral scanning of the optical component 7 is carried out. The details of mathematics from which this can be calculated are more clearly described in the British Provisional Patent Application No. 11386/73.

The beam of light 14 will have a finite size even when focused on to the optical component 7 and it is arranged such that the distance between successive lines of the scan is the same or less than the width of the beam of light when focused on the optical component 7 so that as the beam of light is scanned in a spiral fashion across the optical component 7, all of the surface 52 of the optical component is covered. This can be arranged by varying the electronic controls and in particular, by varying the integration rate of the ramp generator 65.

As mentioned above, it is desired to adjust the position of the focus of the beam 14 to lie on the surface 52 during the scanning process. This may be done in the apparatus just described either by moving the position of the component 7 (and therefore of the surface 52 thereof) along the optical axis, or by moving the focusing lens 5 along its optical axis. It is preferred to move the focusing lens 5 and this is therefore mounted in a movable mount provided with the driving means 70 shown in FIG. 2. The driving means 70 comprises an electrical stepping motor and a screw mechanism adapted to cause motion of the device 5 along its axis in response to rotation of the stepping motor. The mechanism is preferably such that one step of the stepping motor results in a movement of the device 5 rather less than the tolerable distance by which it is intended that the focus of the beam may be allowed to depart from the surface 52. The stepping motor is energised for rotation by a control unit 71 which supplies power to successive windings of the stepping motor in turn in a manner well known. The control unit in turn is adapted to receive at an input 72 thereof pulses derived from a variable-frequency oscillator 73 connected thereto. The frequency of the oscillator 73 is variable in dependence on a signal applied to an input 74 thereof, this input being connected to receive the signal from the generator 65 by way of an adjustable attenuator 75, as shown.

The mathematics relating to the operation of this focusing device are described in the British Provisional Patent Application 11386/73. However, it is well understood that, at least to an approximate degree, the distance by which the lens 5 must be moved as the beam of light 14 is scanned across the optical component 7 away from its axis is a function of the square of the distance of the beam of light from the optical axis of the component 7, that is, $D=kr^2$. Where D is the distance from the lens 5 to the front surface of the optical component 7 and r is the instantaneous distance of the beam of light across the surface of the optical component 7 from the optical axis of component 7.

As this is an approximation and does not take into account higher powers of r it has been found necessary to allow for this by slightly varying the value of k from that which may be calculated. 'k' will, of course, depend on the radius of curvature of the lens under examination.

It will thus be seen that the electronic circuitry shown in FIG. 2 can be adjusted so as to automatically vary the focus of the beam as it moves across the component 7 since the driving means 70 is controlled from the time signal generator 65 as is the spiral scan which is produced by the torque motors 55, 56 again controlled from the generator 65.

As a simplification, the focus may be controlled by causing a sensor to move across the surface of a suitable cam in unison with the scanning of the beam of light across the component 7. In this case, various kinds of cam mechanism may be used but it is preferred to use a non-contacting follower in the form of an air probe to move across the optical component to sense the variation of distance of the surface of the optical component from the lens 5 as the beam of light scans across the surface of the optical component 7. In this case, of course, the driving means 70 is controlled by the air probe.

Advantages of the use of a spiral scan can be readily seen. If a linear scan is used then every time the beam of light passes across the optical component as it does in each scan then the focus of the system must be changed continuously. The focus must pass from its maximum value to its minimum value with every passage of the light beam across the component. However, by using a spiral scan, the focus need only be changed slowly as the light beam slowly traversed radially outwardly across the component during its spiral scan.

Switching may be provided whereby the apparatus can, when required, be caused to operate either in a spiral scanning mode, or in a rectangular raster or other scanning mode. It may be convenient to provide alternative scanning speeds. In particular when spiral scanning is used it may be convenient to cause the frequency of the oscillator 59 to be altered during the scan, so as to enable the speed of scanning along the scanning path to be maintained more nearly constant than it is if the frequency of oscillator 59 is maintained constant. Th reason for this is that if the frequency of the oscillator 59 is constant then it takes the same time for the spot of the beam of light to traverse the first very small spiral sweep of 360° as it does the last large spiral sweep of 360°. It is preferred for the speed of the beam across the surface of the component as it is scanning to be maintained as constant as possible so that the sensitivity of the device remains constant across the surface of the component 7. However, for certain applications it is preferred to look more carefully at the particular part of the lens, for example, the part closest to the centre in which case, it is allowable to allow the beam to move across the surface of the component with a greater speed at the perimeter of the lens than at the centre.

The signal from the amplifier 12 can be viewed in a number of ways. For many purposes it will be sufficient to examine the waveform produced by the amplifier 12 on an oscilloscope which may be synchronized by the use of the signal from generator 65. The beam on the CRO would be synchronised with the scanning light beam and any faults would show directly onto the display of the CRO.

Alternatively more elaborate electronic apparatus may be used to analyse the output signal which apparatus may include pulse height discriminating means and counting means for counting the number of pulses of various heights occurring in the output during the scanning of the component 7 to indicate the count of the number of defects of various magnitudes detected therein. Means may be provided for stabilising the general level of the signal or for stabilising the magnitude of pulses to which the counting or indicating means respond. Such means may include arrangements described in our British Pat. No. 1,303,042 comprising means for producing an analogue comparison waveform from the signal, the comparison waveform being of similar shape to that of the signal but smoothed in relation to the signal with a moving average level which is in a predetermined relationship with the signal, and means for comparing the comparison waveform with the signal to detect whether the signal included information indicative of a defect in the component 7. The means for producing the comparison waveform preferably comprises a low pass filter, and preferably including the modification that the filter's cut-off frequency is adjusted in proportion to the speed of the scan. The adjustment of the cut-off frequency may be accomplished by incorporating within the filter one or more analogue signal control devices such as multipliers to adjust time constants associated with elements of the filter. When the scan is a spiral scan as described, a control input terminal of the or each control device may be connected to the output of the ramp generator 65 so that the signal therefrom controls the cut-off frequency to be proportional to time during the scan. Any of several known types of filter having an electronically adjustable cut-off frequency may be employed.

The apparatus may also be used to inspect reflective components, for example, mirrors. In this case, the apparatus may be adapted so that the retroreflector 8 received and retroreflects light reflected from the surface of the component 7, a corresponding modification to part of the apparatus being depicted in FIG. 3. In FIG. 3 the component is shown inclined at an angle such that light reflected therefrom leaves the component 7 in a region 26 not overlapping the region scanned by the beam 14, the retroreflector 8 being placed in the region 26. In order to preserve the focus of the spot 15 as the component 7 is moved for scanning, the direction of movement 25 of the scanning motion of component 7 is inclined with respect to the axis 13.

When the component 7 under inspection is deeply curved, alternative scanning arrangements may be preferable. A possible scanning arrangement for use with a steeply curved mirror as the component 7 under inspection is shown in FIG. 4. The mirror, denoted 7 is mounted rotatably on an axis 41 in the plane of the scanning motion of the beam provided by the scanning means 6. The retroreflector 8 is arranged to retroreflect light reflected from the surface of the mirror 7, as previously described. A scanning motion is provided by rotating the mirror 7 about the axis 41 slowly by means of a motor 40.

The axis 41 may be inclined with respect to the plane normal to the axis 13 in order to permit the placing of the retroreflector 8 outside the region scanned by the beam 14, in a manner similar to that described with reference to FIG. 3.

In this case the sprial scan may be built up by rotation of the mirror 7 by means of the motor 40 the light beam merely being caused to move radially outwardly from the optical axis of the mirror 7 to provide the spiral scan.

What we claim is:

1. A method of testing an optical component to determine the presence of scratches, sleeks, and like micro-defects therein comprising the steps of: (a) illuminating the component with an incident beam of light focused on part of the component, (b) relatively moving the beam of light and the component to scan successive parts of the component, (c) reflecting retroreflectively light from the beam after it has been influenced by the component so that the retroreflected light forms a cone of light of small angle whose axis passes back and is influenced by the same part of the optical component as the incident focussed beam, (d) collecting and separating the retroreflected light from the incident light beam, and (e) detecting the separated retroreflected light by photo-electric means to produce a signal indicative of said defects in the component.

2. A method as claimed in claim 1 in which the scanning is carried out in the form of an equidistant spiral scan.

3. A method as claimed in claim 1 in which the light beam is automatically focused onto a surface of the optical component during scanning.

4. A method as claimed in claim 3 in which the focus of the light beam is automatically varied as a predetermined function of time.

5. A method as claimed in claim 3 in which the focus of the light beam is automatically varied in response to the position of the beam across the surface of the optical component.

6. A method as claimed in claim 1 in which the light beam is passed in one direction through a phase plate before it is retroreflected and in the opposite direction after it is retroreflected.

7. An apparatus for inspecting an optical component to detect scratches, sleeks and like micro-defects therein comprising: (a) means for supporting the optical component, (b) a light source, (c) means for producing an incident beam of light focussed on part of the component when so supported, (d) means for relatively moving the beam and the component to scan successive parts of the component, (e) retroreflective means for retroreflecting light derived from the beam which has been influenced by the component so that the light is retroreflected in the form of a cone of small angle whose axis passes back through the same part of the optical component, (f) means for collecting and separating the retroreflected light from the incident light beam, and (g) photo-electric means to derive an electric signal in dependence on the separated retroreflected light.

8. Apparatus as claimed in claim 7 in which the means for relatively moving the beam and optical component comprises means for deflecting the beam comprising two beam deflectors, one of which is adapted to move the beam across the optical component in one direction and the other of which is adapted to move the beam across the optical component in a direction perpendicular thereto to produce a spiral scan.

9. Apparatus as claimed in claim 8 in which the deflectors comprise plane mirrors.

10. Apparatus as claimed in claim 8 in which motors are provided to move one deflector to cause movement of the beam as a function $A \cos\omega t$ and the other deflector to cause movement of the beam as a function $B \sin\omega t$.

11. Apparatus as claimed in claim 10 in which the motors are electric torque motors.

12. Apparatus as claimed in claim 11 including a signal generator having two outputs, one for controlling one motor and the other for controlling the other motor, one output providing an electric signal function $A \cos\omega t$ and the other an electric signal function $B \sin\omega t$.

13. Apparatus as claimed in claim 12 in which the outputs of the signal generator include respective variable signal attenuators, the attenuators being varied, in use, by signals from a ramp generator so that in the signal functions produced by the signal generator, the functions, A, B are functions of time, $A(t)$, $B(t)$ respectively.

14. Apparatus as claimed in claim 13 in which the ramp generator is a feedback integrator.

15. Apparatus as claimed in claim 14 in which the feedback integrator includes means for varying the rate of integration.

16. Apparatus as claimed in claim 7 in which the means for producing the beam of light includes focusing means adapted, in use, automatically to retain the focal point of the beam of light on a surface of the optical component during the scanning operation.

17. Apparatus as claimed in claim 16 in which means is provided to vary the focus of the focusing means as a function of time automatically to retain the focus of the beam of light on a surface of the optical component during the scanning operation.

18. Apparatus as claimed in claim 16 in which adjusting means is provided to vary the focus of the focusing means in response to the position of the beam across a surface of the optical component automatically to retain the focus of the beam of light on the surface of the optical component during the scanning operation.

19. Apparatus as claimed in claim 18 in which the adjusting means may comprise a cam mechanism operable by the scanning operation.

20. Apparatus as claimed in claim 19 in which the cam, in use, comprises the surface of the optical component itself.

21. Apparatus as claimed in claim 20 in which the adjusting means includes a non-contacting follower for following the surface of the optical component.

22. Apparatus as claimed in claim 21 in which the non-contacting follower comprises an air probe.

23. Apparatus as claimed claim 7 in which a phase plate is positioned in the light path between the separating means and the retroreflective means.

24. Apparatus as claimed in claim 23 in which the phase plate is a quarter-wave plate.

25. Apparatus as claimed in claim 23 in which the separating means comprises a beam-splitting cube.

26. Apparatus as claimed in claim 25 in which the beam-splitting cube is a polarising beam-splitting cube.

27. Apparatus as claimed in claim 7 in which there is provided an output display comprising a cathode ray tube in which in use, the cathode ray is scanned across the screen in unison with the beam of light and the cathode ray is scanned across the screen in unison with the beam of light and the cathode ray is influenced when a defect is detected to thereby build up on the screen a picture of the faults on the optical component.

28. Apparatus as claimed in claim 7 in which means is provided for measuring the total length of time during a complete scan for which a defect is detected.

29. Apparatus as claimed in claim 28 in which there is provided means for comparing the detected total time with a standard to automatically accept or reject the optical component.

* * * * *